United States Patent [19]
Delmer

[11] Patent Number: 5,252,162
[45] Date of Patent: Oct. 12, 1993

[54] MULTIPLE CHAMBER DRIP IRRIGATION HOSE MADE FROM A SINGLE STRIP

[75] Inventor: Daniel W. C. Delmer, 17044 Bluewater La., Huntington Beach, Calif. 92649

[73] Assignees: William A. Delmer; Robert J. Delmer; Daniel W. C. Delmer, all of Huntington Beach, Calif.

[21] Appl. No.: 826,462

[22] Filed: Jan. 27, 1992

Related U.S. Application Data

[60] Division of Ser. No. 784,737, Nov. 4, 1991, Pat. No. 5,118,042, which is a continuation of Ser. No. 659,446, Feb. 22, 1991, abandoned, which is a continuation of Ser. No. 371,101, Jun. 26, 1989, abandoned.

[51] Int. Cl.⁵ .............................. B29C 53/08
[52] U.S. Cl. ................... 156/203; 156/204; 156/218; 156/227; 156/268
[58] Field of Search ............ 156/203, 466, 204, 218, 156/227, 268; 239/542; 138/42

[56] References Cited

U.S. PATENT DOCUMENTS

| | | |
|---|---|---|
| 2,798,768 | 7/1957 | Babin . |
| 3,008,862 | 11/1961 | Haine et al. . |
| 3,467,142 | 9/1969 | Boyle et al. . |
| 3,774,850 | 11/1973 | Zeman .................... 239/542 |
| 3,779,468 | 12/1973 | Spencer ................... 239/542 |
| 3,870,236 | 3/1975 | Barragan ................. 239/542 |
| 3,873,030 | 3/1975 | Barragan ................. 239/542 |
| 3,896,999 | 7/1975 | Barragan ............... 239/542 X |
| 3,903,929 | 9/1975 | Mock ........................ 138/115 |
| 4,009,832 | 3/1977 | Tiedt ......................... 239/542 |
| 4,047,995 | 9/1977 | Diaz ....................... 239/542 X |
| 4,177,946 | 12/1979 | Barragan .............. 239/542 X |
| 4,196,853 | 4/1980 | Delmer ..................... 239/116 |
| 4,247,051 | 1/1981 | Allport ...................... 239/542 |
| 4,354,639 | 10/1982 | Delmer ..................... 239/542 |
| 4,430,020 | 2/1984 | Robbins .................... 239/542 |
| 4,534,515 | 8/1985 | Chapin ...................... 239/542 |
| 4,548,360 | 10/1985 | Delmer et al. ............ 239/542 |
| 4,572,756 | 2/1986 | Chapin ...................... 156/203 |
| 4,626,130 | 12/1986 | Chapin ................... 239/542 X |
| 4,642,152 | 2/1987 | Chapin ...................... 156/203 |
| 4,655,397 | 4/1987 | Gorney ...................... 239/542 |

Primary Examiner—Michael W. Ball
Assistant Examiner—Richard Crispino
Attorney, Agent, or Firm—Harris, Kern, Wallen & Tinsley

[57] ABSTRACT

A multiple chamber hose for drip irrigation and the like, with a primary chamber for fluid flow therethrough and a multiple layer section having a primary layer, a mid layer and a secondary layer, and with a secondary chamber in said mid layer for fluid flow therethrough. The primary layer is positioned between the primary chamber and the mid layer, and the secondary layer is positioned between the mid layer and the exterior. The hose includes an inlet opening for fluid flow from the primary chamber to the secondary chamber and an outlet opening for fluid flow from the secondary chamber to the exterior. The invention also includes methods of making such a hose.

17 Claims, 6 Drawing Sheets

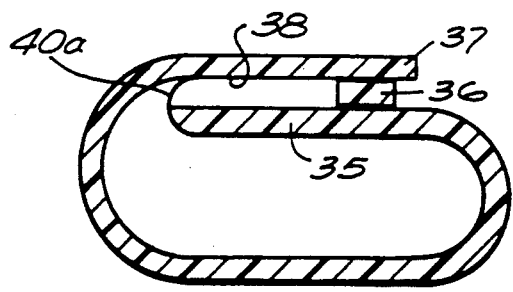
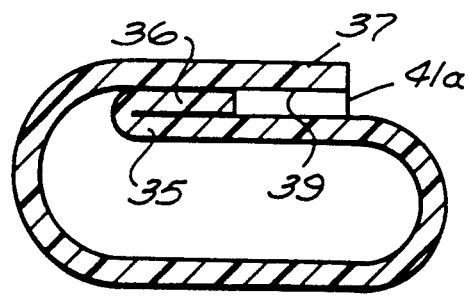
FIG. 9A    FIG. 9B
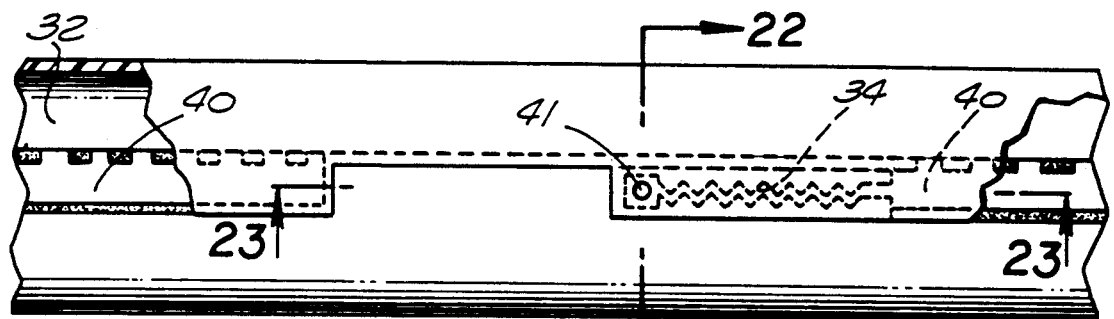
FIG. 20
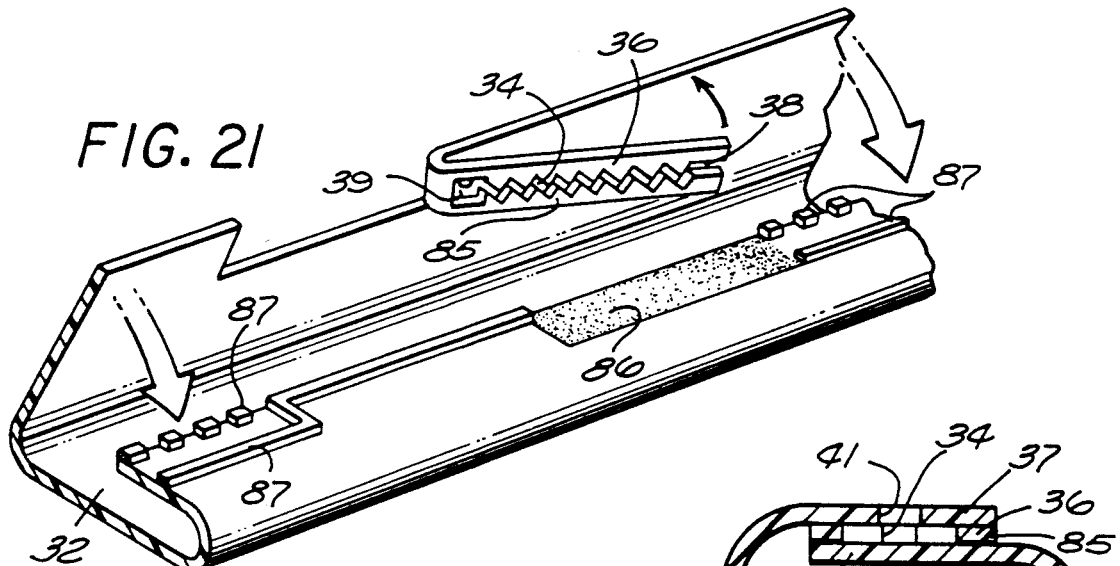
FIG. 21
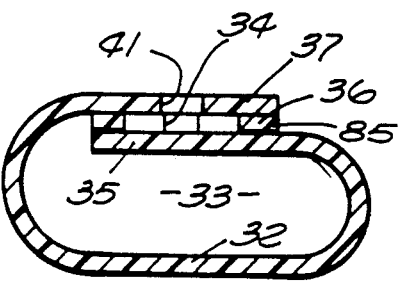
FIG. 22
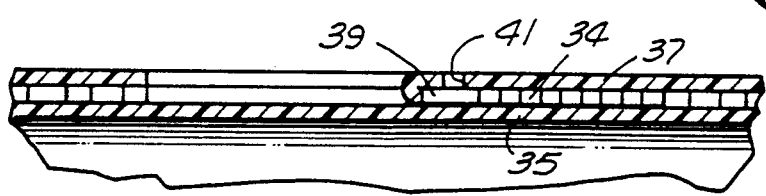
FIG. 23

MULTIPLE CHAMBER DRIP IRRIGATION HOSE MADE FROM A SINGLE STRIP

This application is a division of 07/787,737, filed Nov. 4, 1991, now U.S. Pat. No. 5,118,042, which was a continuation of 07/659,446, filed Feb. 22, 1991, now abandoned, which was a continuation of 07/371,101, filed Jun. 26, 1989, now abandoned.

BACKGROUND OF THE INVENTION

This invention relates to a multiple chamber hose suitable for drip irrigation and the like, and to a method of making such a hose.

Drip irrigation hose has been formed from continuous plastic strips for a considerable period of time, and there is a wide range of prior patents in the field. The most pertinent of these known to applicants are listed in the attached Information Disclosure Statement.

The various prior art hoses operate in the same general manner. A primary chamber is connected to the water supply, and the pressure in the primary chamber is relatively high. Some form of flow restriction devices are incorporated in or added to the hose for distributing water at spaced locations along the hose at a substantially reduced pressure. One problem in the manufacture and use of such hose is achieving and maintaining a desired stable low rate of flow from the restriction devices. Such irrigation hose is manufactured in rolls and is installed in very long lengths, with typical roll lengths in the range of 3,000 to 15,000 feet. Uniformity in the construction of the restriction device over thousands and thousands of feet of hose at high speeds has been difficult.

Another problem encountered with irrigation hose is the cost of manufacture, since large quantities of the hose are utilized and typically must be replaced every growing season. Therefore a design and method of manufacture which permits high speed production while at the same time maintaining precise control of the restriction devices is highly desirable.

Accordingly, it is an object of the present invention to provide a new and improved multiple chamber hose and a method of making such a hose which is less expensive, more accurate, and more reliable than present hose.

Another problem with many present manufacturing methods is that they require molding of plastic to establish the restricted flow paths. This usually is performed by melting plastic resins and forming the entire tube or by forming the secondary flow path from molten plastic and adding it to the cured plastic film while still in a semi-moltent stage. The cured film forms the main body of the tube. See for example the U.S. Pat. Nos. to Chapin, 4,534,515 and 4,572,756, and Mock 3,903,929. The above mentioned techniques are limited in rate of production due to the molten nature of the material and the necessary cure time. Uniformity of the restricting secondary chamber is an important consideration in hose manufacture because of its effect on uniform flow rates desired for the finished product in the field. In contrast the precision die cutting of the secondary chamber in the present invention provides exact repeatability with high rates of production. Further, deformation of the tube forming material with its accompanying uniformity problems is not required.

Other objects, advantages, features and results will more fully appear in the course of the description.

SUMMARY OF THE INVENTION

A multiple chamber hose for drip irrigation and the like having a primary chamber for fluid flow therethrough and a multiple layer section with a primary layer, a mid layer and a secondary layer and with a secondary chamber in the mid layer for fluid flow therethrough. The primary layer is positioned between the primary chamber and the mid layer, and the secondary layer is positioned between the mid layer and the exterior. The hose includes an inlet opening for fluid flow from the primary chamber to the secondary chamber and an outlet opening for fluid, flow from the secondary chamber to the exterior. The invention also includes methods of making such a hose.

A feature of the invention is the provision of the restriction device as a secondary chamber which can be cut in the material in a precision manner. A further feature is the method of manufacture utilizing a continuous strip or, in one embodiment, two continuous strips, including the steps of cutting, glueing, folding and pressing, all in a continuous high speed operation.

The multiple layer section and the secondary chamber may have various configurations, including those specific embodiments hereinafter disclosed.

BRIEF DESCRIPTION OF THE DRAWINGS

FIGS. 9A and 9B are partial sectional views of a hose produced with the strip of FIG. 9 and illustrating the operation of the secondary chambers;

FIG. 10 is a view similar to that of FIG. 4 showing another embodiment of the cutting of a strip of material prior to folding in;

FIG. 20 is a top view of a length of multiple chamber hose, partly broken away, showing another alternative embodiment of the invention;

FIG. 21 is a perspective view of the hose of FIG. 20, illustrating the manufacture of the hose;

FIG. 22 is a sectional view taken along the line 22—22 of FIG. 20;

FIG. 23 is a partial sectional view taken along the line 23—23 of FIG. 20;

DESCRIPTION OF THE PREFERRED EMBODIMENTS

Figure 1:
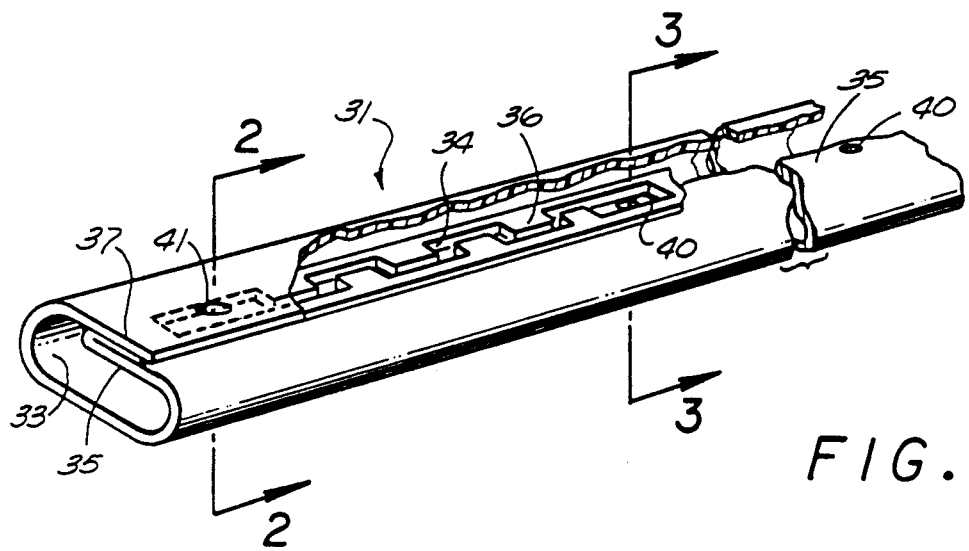
FIG. 1 is a perspective view of a length of multiple chamber hose, partly broken away, and showing the presently preferred embodiment of the invention.

The presently preferred embodiment of a hose 31 is shown in FIGS. 1-4. The hose is made from a single strip 32 of a waterproof material, typically a plastic such as polyethylene. The hose has a primary chamber 33 and a plurality of secondary chambers 34. The hose includes a multiple layer section comprising a primary layer 35, a mid layer 36 in an edge portion 36a, and a secondary layer 37 in an edge portion 37a. Each of the secondary chambers 34 has a chamber inlet 38 and a chamber outlet 39. Inlet openings 40 are provided in the primary layer 35 and outlet openings 41 are provided in the secondary layer 37. The strip 32 has opposing edges 42, 43.

Figure 2:
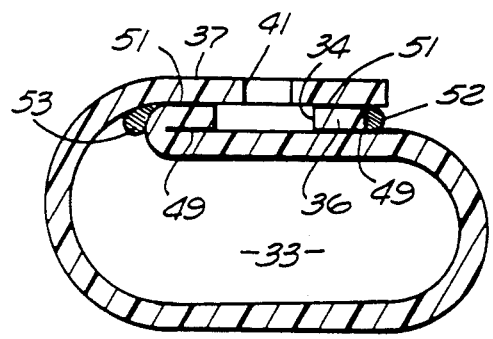
FIGS. 2 and 3 are enlarged sectional views taken along the lines 2—2 and 3—3 of FIG. 1, respectively.
Figure 3:
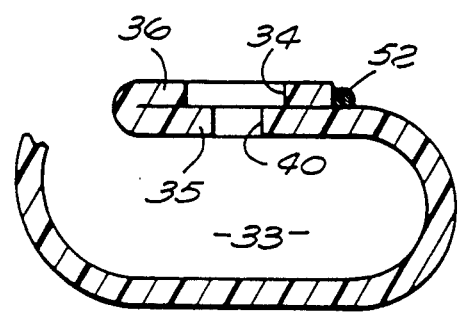

Long lengths of the hose may be formed from the strip 32 in a continuous operation. The secondary chambers 34 and the openings 40, 41 are die cut or otherwise formed in the strip. Alternative methods of cutting include laser cutting and heat cutting. Next an adhesive is applied to the underside of the strip at the primary layer 35, typically in the zone 48 defined by the dashed lines, and the edge 42 with the mid layer 36 is folded under and bonded to the primary layer 35 by the adhesive. This adhesive layer is shown by the heavy line 49 in FIG. 2. Another layer of adhesive is applied on the secondary layer 37, typically in the zone 50 defined by the edge 43 and the dashed line. The strip is folded to bring the secondary layer 37 into engagement with the mid layer 36, as shown in FIG. 2. This adhesive layer is shown by the heavy line 51 in FIG. 2. If desired, a bead of adhesive 52 may be applied between the primary layer and the secondary layer, and a bead of adhesive 53 may be applied between the mid layer and the secondary layer for additional strength. Also, heat sealing may be utilized in place of adhesive bonding if desired. Vibration or sonic bonding also is a method of bonding plastic material.

Figure 4:
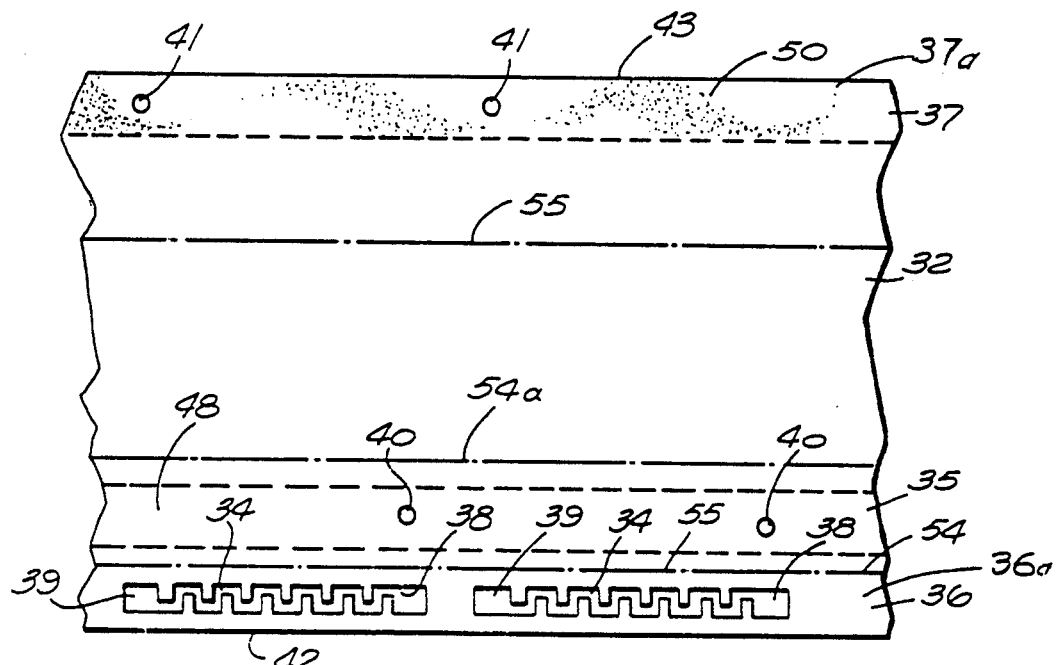
FIG. 4 is a plan view of a strip of the material used for forming the hose of FIG. 1, and illustrating the openings formed in the strip of material prior to folding.

Typically during the folding and bonding operations, the hose passes between rollers which produce a substantially flat structure, with the fold lines indicated by the phantom lines 54, 54a and 55 in FIG. 4. However when the primary chamber 33 is filled with water under moderate pressure, the hose assumes a shape substantially as shown in FIGS. 1 and 2, with the actual shape depending upon the water pressure. With higher pressure, the hose is more nearly circular.

In operation, a water supply is connected to the primary chamber 33 at one end of a length of a hose, with the other end of the hose clamped shut. Water flows from the primary chamber through the inlet openings 40 into the chamber inlets of the secondary chambers. The secondary chambers typically are serpentine, and provide restricted flow between the chamber inlet and the chamber outlet, and water flows from the secondary chamber through the outlet openings to the exterior of the hose at a relatively slow rate. The rate of flow is determined by the dimensions of the hose, including the size and shape of the secondary chambers, and by the pressure in the primary chamber. The secondary chambers may take various shapes, and several forms are disclosed. In the embodiment of FIGS. 1-4, the secondary chambers have a square wave configuration.

With the construction of the present invention, the secondary chambers may be precisely cut so that they provide uniform flow from each of the outlet openings, while operating at high production rate. Also, the secondary chamber may be configured to provide compensation for variations in supply pressure and maintain a substantially uniform output flow rate.

Figure 5:
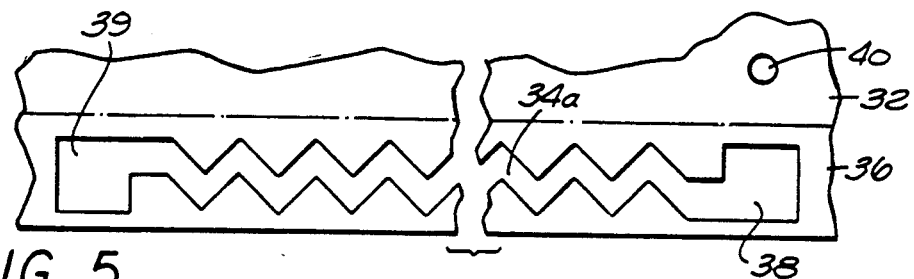
FIG. 5 is an enlarged partial view similar to that of FIG. 4 showing an alternate configuration for the secondary chamber.

An alternative shape for the secondary chamber is shown in FIG. 5 with a saw tooth pattern 34a.

Figure 6:
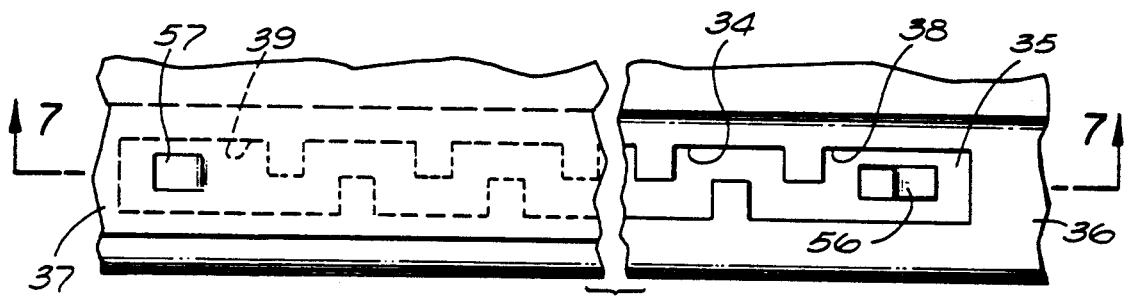
FIG. 6 is a top view of a portion of a length of hose showing another alternative embodiment with flaps.
Figure 7:
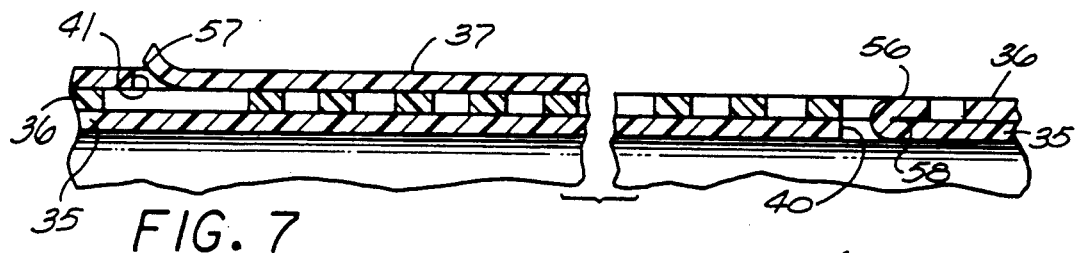
FIG. 7 is a partial sectional view taken along the line 7—7 of FIG. 6.

Another alternative construction is shown in FIGS. 6 and 7, with a flap 56 in the primary layer 35 to provide the inlet opening 40 and with a flap 57 in the secondary layer 37 to provide the outlet opening 41. Typically the openings at 40, 41 will be produced by punching, while the flaps 56, 57 will be produced by lancing. In the preferred embodiment, the flaps 56 will be bonded to the primary layer 35 by an adhesive at 58, while the flaps 57 will be free. Use of the flap 57 at the outlet opening provides protection for the secondary chamber when the hose is not pressurized. The use of flaps eliminates the requirement of removing the material punched out for the openings 40, 41.

Figure 8:
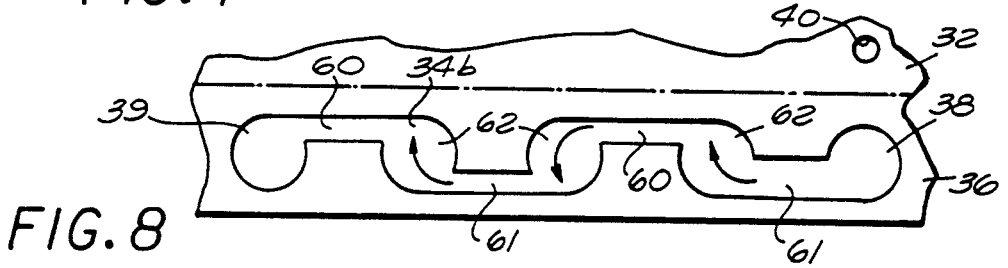
FIG. 8 is a view similar to that of FIG. 5 showing another alternative embodiment of the invention.

Another shape for the secondary chamber is shown in FIG. 8, with the chamber 34b formed of alternating offset sections 60, 61, with the offset sections joined by circular sections 62. With this configuration, additional turbulent flow is obtained in the circular sections, thereby obtaining increased flow restriction in a lesser distance. This embodiment is especially suited for input pressure compensation.

Figure 9:
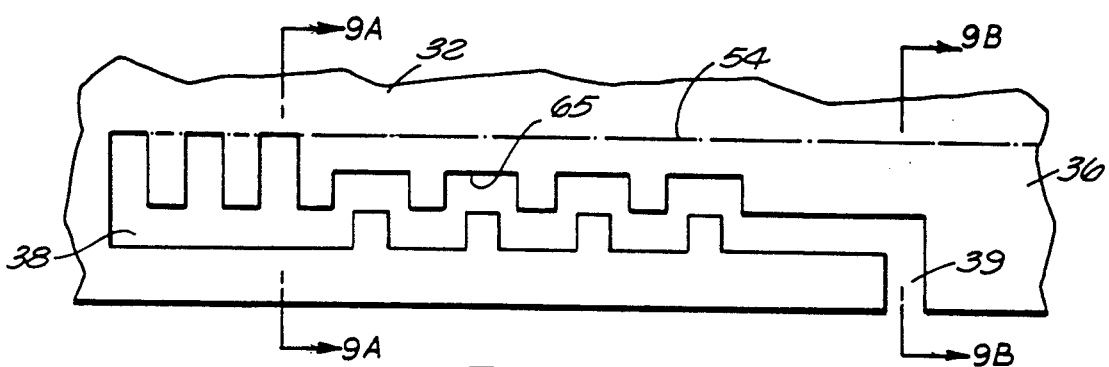
FIG. 9 is another view similar to that of FIGS. 5 and 8 showing another alternative embodiment.

Another alternative form for the secondary chamber is shown as 65 in FIGS. 9, 9A and 9B. In this embodiment, the inlet chamber 38 extends to the fold line 54 and the outlet chamber 39 extends to the edge 42 of the strip. Then when the strip is folded to form the hose, the open edge of the chamber 38 serves as the inlet opening or openings 40a and the open edge of the chamber 39 serves as the outlet opening or openings 41a. The sectional FIGS. 9A and 9B are of a finished hose while FIG. 9 is of the film prior to folding. The section lines on FIG. 9 are used to show where the sections are taken of the finished hose.

Figure 10:
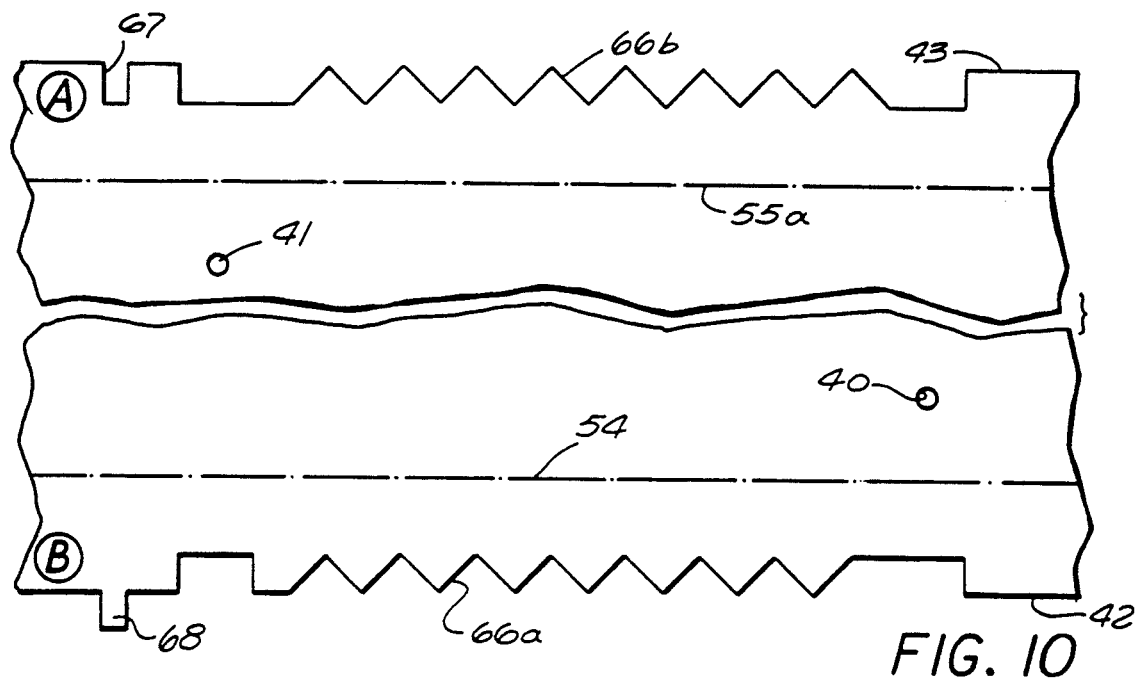
Figure 12:
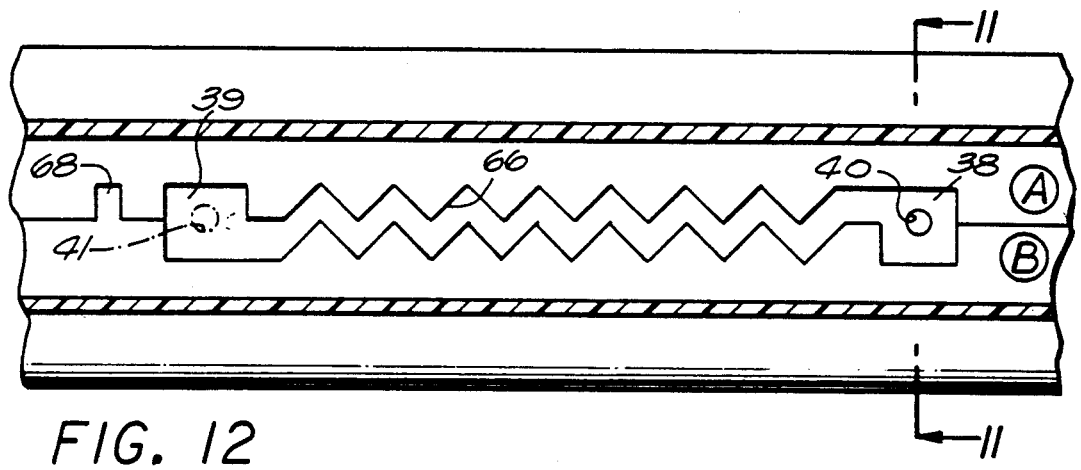
FIG. 12 is a sectional view taken along the line 12—12 of FIG. 11.
Figure 11:
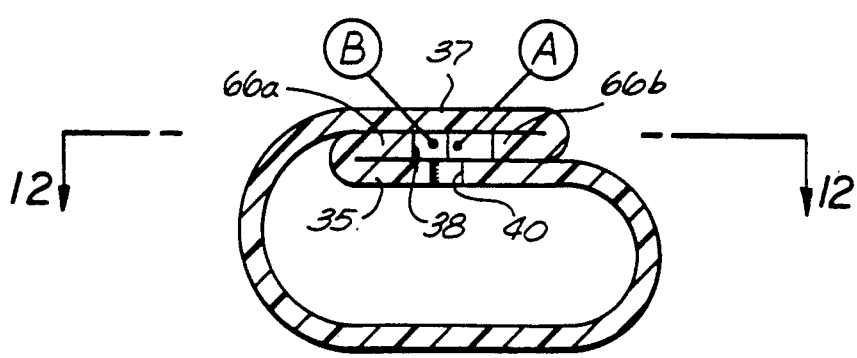
FIG. 11 is a cross sectional view of the hose formed from the strip of FIG. 10.

Another alternative embodiment is shown in FIGS. 10-12 with the secondary chamber 66 being formed by cut outs 66a at edge 42 and cut outs 66b at edge 43. The edge 42 is folded back on itself at line 54 and cemented in place, and the edge 43 is folded back on itself at line 55a and cemented in place, as shown in FIG. 11. Preferably, a registration notch 67 is formed in one edge and a registration flap 68 is formed in the other edge, with the flap being positioned in the notch on folding, as shown in FIG. 12 for maintaining alignment of the cut outs 66a, 66b to form the secondary chamber 66. This embodiment can be used in reducing waste when several hoses are being produced in parallel from a single wide film strip. A cut out at each end of the chamber 66 at 38 and 39 could extend to the respective fold lines 54 and 55a to serve as the inlet and outlet openings, in place of the openings 40 and 41.

Figure 13:
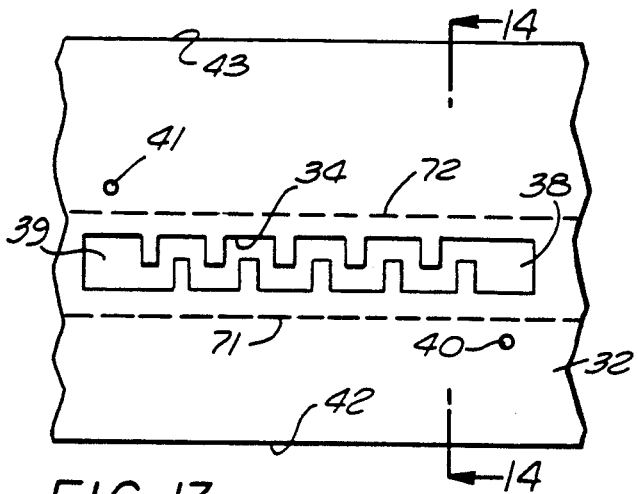
FIG. 13 is a view similar to that of FIG. 4 showing another alternative embodiment of the invention.
Figure 14:
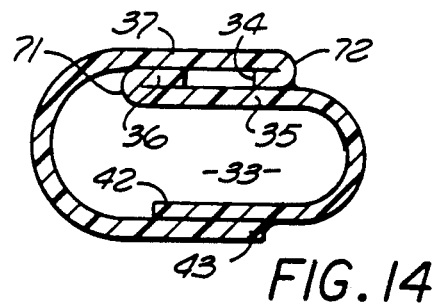
FIG. 14 is a cross sectional view of a hose produced from the strip of FIG. 13.

In the embodiment illustrated in FIGS. 13, 14, the secondary chamber 34 is formed in the middle of the strip 32, with the strip folded over on opposite sides of the secondary chamber at lines 71, 72 to form the multiple layer section, and with the edges 42, 43 joined together away from the multiple layer section.

Figure 16:
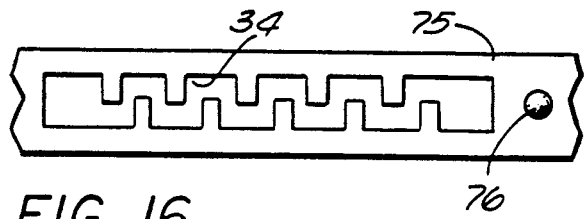
FIG. 16 is a top view of the second strip of FIG. 15.
Figure 15:
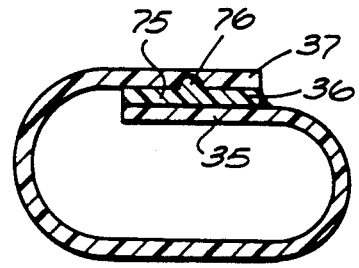
FIG. 15 is a cross sectional view similar to that of FIG. 2 showing an alternative embodiment with a second strip forming the mid layer.

In the embodiment of FIGS. 15 and 16, the mid layer of the multiple layer section is formed of a separate strip 75, with the secondary chambers formed in this separate strip. A short length of the separate strip may be used for each secondary chamber, or a continuous separate strip may be utilized with the secondary chambers formed therealong in the same manner as with the strip 32. A locating button 76 maybe formed in the secondary strip 75 if desired. In assembly, the strip 75 is adhered to one edge of the strip 32 and the other edge of the strip 32 is adhered to the strip 75, with the strip 75 serving as the mid layer 36 as shown in FIG. 15.

Figure 18:
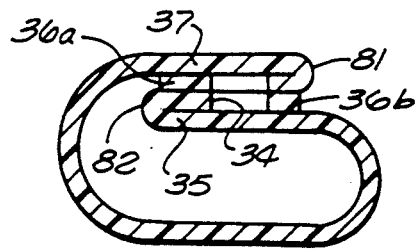
FIG. 18 is a cross sectional view of a hose formed from the strip of FIG. 17.
Figure 17:
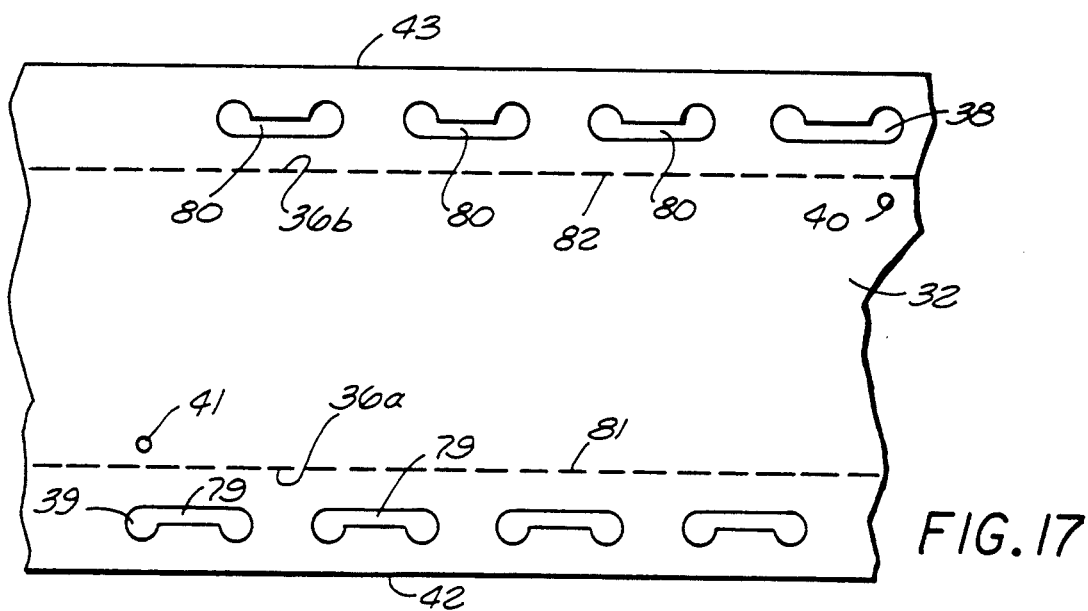
FIG. 17 is a view similar to that of FIG. 4 showing another alternative embodiment of the invention.

Another embodiment is shown in FIGS. 17 and 18, with the secondary chamber formed by a plurality of openings 79 along the edge 42 and another plurality of openings 80 along the edge 43, with the ends of opposed openings aligned to provide a continuous secondary chamber when assembled in the configuration of FIG. 18. The edge 42 is folded back on itself along the line 81 and the edge 43 is folded back on itself along the line 82, and the folded over edges are joined together to form the primary chamber and the multiple layer section. In this embodiment, the mid layer of the multiple layer section comprises two layers 36a, 36b, and the secondary chamber alternates between the two sections. In an alternative configuration, the openings 79 could be joined to form a continuous opening and the openings 80 could be joined to form a continuous opening, with a resultant secondary chamber 34 having a double height produced by the double thickness of the strip material comprising the mid layer.

Figure 19:
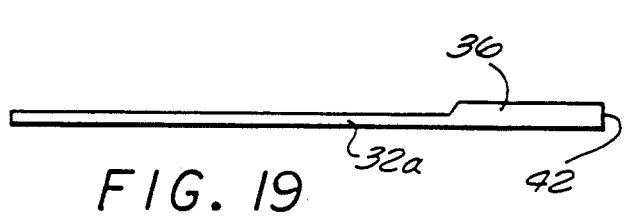
FIG. 19 is an end view of a hose forming strip showing an extruded configuration.

The strip 32 is usually formed with a cross-section of substantially uniform thickness, as is obtained with the conventional blown film or bubble plastic strip manufacturing process. Alternatively, the strip can be produced by extrusion, and in this instance, the thickness of the strip can be varied if it is desired to have one portion of the hose thicker or thinner than another. One such arrangement is shown in FIG. 19 which is an end view of a strip 32a produced by extrusion. This strip is made thicker along the edge 42 which provides the mid layer 36 and can be used when a higher flow rate secondary chamber is desired. Alternatively, the mid layer 36 can be made thinner than the remainder of the strip when a lower flow rate secondary chamber is desired.

Another alternative embodiment is shown in FIGS. 20-23, wherein the mid layer 36 between the primary layer 35 and secondary layer 37 is formed as a flap 85 cut out of the strip of material and folded inwardly. Elements corresponding to those of prior embodiments are identified by the same reference numbers. In manufacture, a thin adhesive film 86 and adhesive beads 87 are applied along the edge of the strip which forms the primary layer 35, typically in the pattern illustrated in FIG. 21. The adhesive film 86 is very thin and serves to hold the flap 85 in place. The adhesive beads are used to form the inlet openings 40. The strip of material utilized for forming the hose typically is in the order of 0.004 to 0.015 inches thick. The adhesive beads should be a bit thicker, and typically with a minimum thickness of 0.007 inches, so that the space formed by the beads between the primary and secondary layers can function as the inlet opening. As with the earlier embodiments, the secondary chamber 34 and the flap 85 may have various configurations, depending on the amount of flow control desired. Also, a flap 57, as shown in FIG. 7, may be used for the outlet opening 41.

Figure 24:
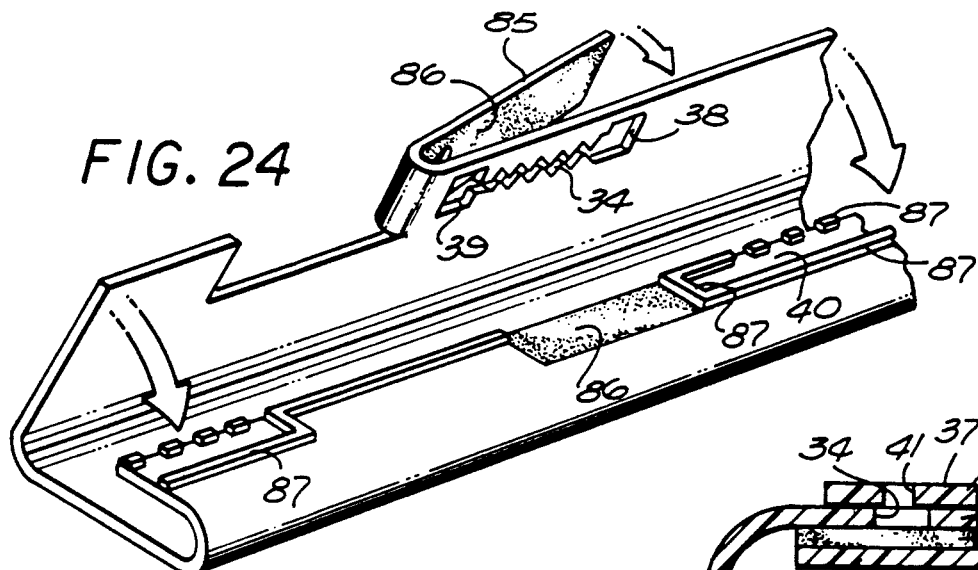
FIGS. 24, 25 and 26 are views corresponding to FIGS. 21,22 and 23, respectively, of another alternative embodiment.
Figure 25:
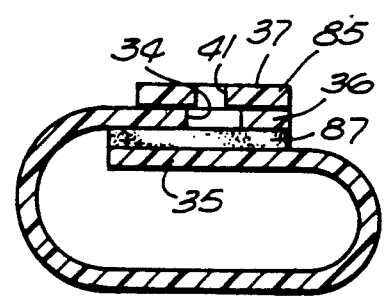
Figure 26:
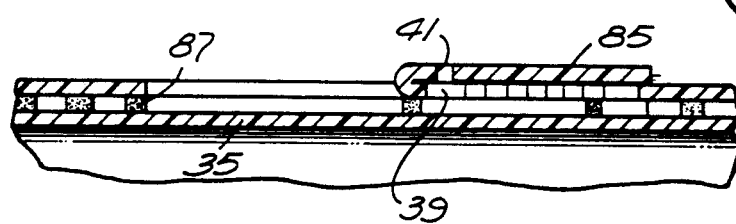

The embodiment of FIGS. 24-26 is similar to that of FIGS. 20-23, with the flap 85 folded to the outside to serve as the secondary layer 37, and with the secondary chamber 34, chamber inlet 38 and chamber outlet 39 formed adjacent to the edge of the strip, which serves as the midlayer 36.

Figure 27:
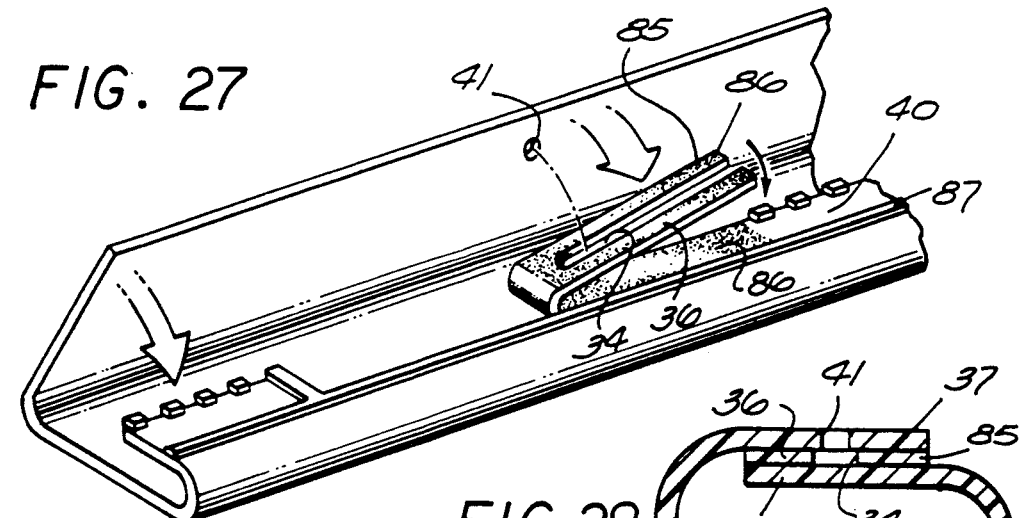
FIGS. 27, 28 and 29 are another set of views corresponding to FIGS. 21, 22 and 23, respectively, of another alternative embodiment.
Figure 28:
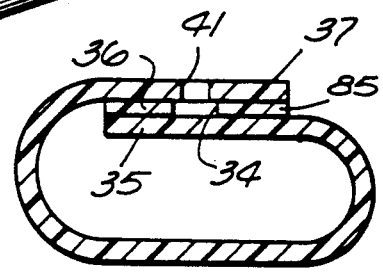
Figure 29:
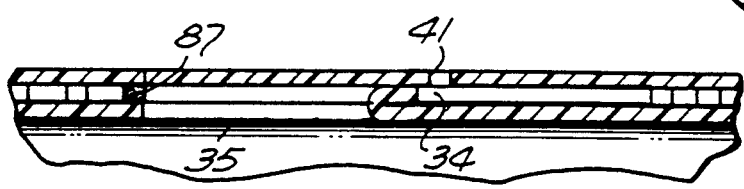

The embodiment of FIGS. 27-29 is similar to those of FIGS. 20-23 and FIGS. 24-26. In this embodiment, the flap 85 is formed from the opposite edge of the strip, with the flap folded between the edges to serve as the mid-layer 36, with the secondary chamber 34 formed in the flap. The operation of the last three embodiments is the same as that of the earlier embodiments. Water flows through the primary chamber 35 into the inlet opening 40 formed by the adhesive beads, and then into the chamber inlet 38 of the secondary chamber 34. The water flows along the secondary chamber 34 to the chamber outlet 39, and then outward to the area to be irrigated through the outlet opening 41.

I claim:

1. A method of making a multiple chamber hose suitable for drip irrigation from a single strip material having opposing edge portions, including the steps of:

forming secondary chambers in the strip material by removing material from the strip material with said secondary chambers having a second axis;

forming inlet openings and outlet openings in the strip material;

folding the material to form a multiple layer section having a primary layer of the material, a mid layer of the material and a secondary layer of the material, and to form a primary chamber having a first axis parallel to said second axis for fluid flow therethrough along said first axis, with the secondary chambers defining a circuitous path in the mid layer providing for restricted fluid flow therethrough, and with the primary layer positioned between the primary chamber and the mid layer and with the secondary layer positioned between the mid layer and the exterior, and with the inlet openings providing for fluid flow from the primary chamber to the secondary chambers and with the outlet openings providing for fluid flow from the secondary chambers to the exterior; and adhering the primary, mid an secondary layers together.

2. The method as defined in claim 1 including forming the secondary chambers along one edge portion of the strip of material.

3. The method as defined in claim 1 including forming the secondary chambers along a central zone of the strip of material.

4. The method as defined in claim 1 including forming the inlet and outlet openings as holes through the material.

5. The method as defined in claim 1 including forming the inlet and outlet openings as flaps in the material.

6. The method as defined in claim 5 including adhering the flaps of the inlet openings in the primary layer to the primary layer.

7. The method as defined in claim 1 including,
cutting one of the inlet and outlet openings at one edge of the material and cutting the other of the inlet and outlet openings in from the one edge, with the secondary chambers therebetween and directly connected to inlet and outlet openings, and
folding the material to form a fold line and position the inlet and outlet openings and the secondary chambers in the mid layer with the inlet openings at the fold line.

8. The method as defined in claim 1 including cutting the secondary chambers in at least one edge of the material, and
folding the material to bring the opposite edges of the material together as the mid layer.

9. The method as defined in claim 1 including cutting a portion of each secondary chamber in each edge of the material, and
folding the material to bring the opposite edges together as the mid layer.

10. The method as defined in claim 1 including cutting the secondary chambers in portions by cutting a first row of spaced openings along a longitudinal axis of the strip of material and cutting a second row of spaced openings along a parallel longitudinal axis of the strip of material, with the first and second rows alternating, and
folding the material along one edge to overlap the first row of spaced openings onto the strip forming a first opening edge portion and along the opposite edge to overlap the second row of spaced openings onto the material forming a second opening edge portion; and
folding the material between the first and second opening edge portions to overlap the first and second rows of openings to provide a continuous secondary chamber.

11. The method as defined in claim 1 including forming the mid layer by cutting a flap in an edge portion of the strip leaving a void in the edge portion, folding the flap back onto the edge portion, and sealing at the void by applying an adhesive bead at the void.

12. The method as defined in claim 1 including forming the secondary layer by cutting a flap in an edge portion of the strip leaving a void in the edge portion, folding the flap back onto the edge portion, and sealing at the void by applying an adhesive bead at the void.

13. The method as defined in claim 1 including forming the secondary chamber and inlet openings in the strip of material to provide the primary and mid layers, and covering the secondary chambers with the secondary layers having the outlet openings therein, 14. A method of making a multiple chamber hose suitable for drip irrigation from a single strip material having opposing edge portions, including the steps of:
forming a secondary chamber in the strip material by removing material from the strip material with said secondary chamber having a second axis;
forming inlet openings and outlet openings in the strip material;
folding the material to form a multiple layer section having a primary layer of the material, a mid layer of the material and a secondary layer of the material, and to form a primary chamber having a first axis parallel to said second axis for fluid flow therethrough along said first axis,
with the secondary chamber defining a circuitous path in the mid layer providing for restricted fluid flow therethrough, and with the primary layer positioned between the primary chamber and the mid layer and with the secondary layer positioned between the mid layer and the exterior, and
with the inlet openings providing for fluid flow from the primary chamber to the secondary chamber and with the outlet openings providing for fluid flow from the secondary chamber to the exterior; and
adhering the primary, mid and secondary layers together.

15. The method as defined in claim 14 with one of said edge portions folded onto itself and positioned against the other of said edge portions with said secondary chamber formed in said one edge portion.

16. The method as defined in claim 14 with each of said opposing edge portions folded over on itself opposite the other edge portion to form said mid layer, and with at least one of the opposing edge portions having a cutout pattern defining the secondary chamber when the edge portions are opposite each other.

17. The method as defined in claim 14 including,
cutting one of the inlet and outlet openings at one edge of the material and cutting the other of the inlet and outlet openings in from the one edge, with the secondary chamber therebetween and directly connected to inlet and outlet openings, and
folding the material to form a fold line and position the inlet and outlet openings and the secondary chambers in the mid layer with the inlet openings at the fold line.

* * * * *